Figure 1:
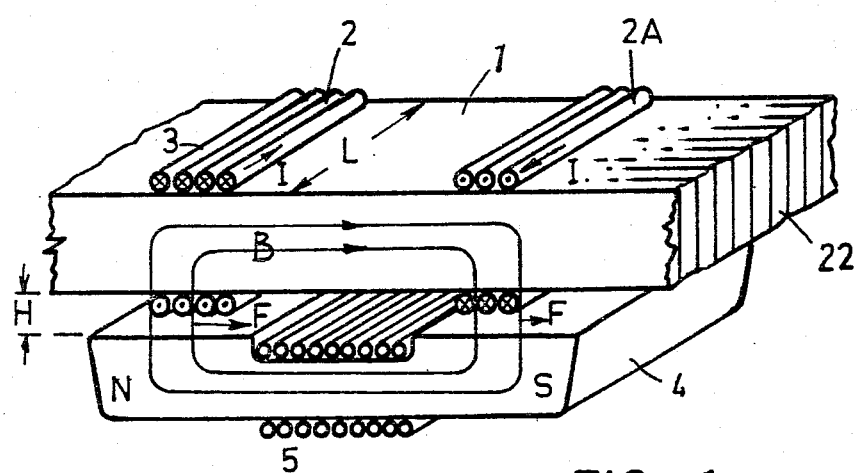

United States Patent [19]
Lamb

[11] 3,912,992
[45] Oct. 14, 1975

[54] PARALLEL CONNECTED LINEAR ELECTRIC MOTOR SYSTEM

[75] Inventor: Cedric St. John Lamb, Sydney, Australia

[73] Assignee: Kenneth Barrington Wyld, Lugarno, Australia; a part interest

[22] Filed: May 28, 1974

[21] Appl. No.: 473,804

[30] Foreign Application Priority Data
June 1, 1973 United Kingdom............... 26165/73

[52] U.S. Cl. ............ 318/135; 104/148 LM; 310/12
[51] Int. Cl.² ......................................... H02K 41/02
[58] Field of Search .......... 310/12, 13, 14; 318/135; 104/148 LM, 148 MS

[56] References Cited
UNITED STATES PATENTS

| | | | |
|---|---|---|---|
| 3,707,924 | 1/1973 | Barthalon..................... | 104/148 MS |
| 3,741,613 | 6/1973 | Pfaler........................... | 104/148 MS |
| R28,161 | 9/1974 | Bolton et al. ........................ | 310/13 |

*Primary Examiner*—R. N. Envall, Jr.
*Attorney, Agent, or Firm*—Henry M. Bissell

[57] ABSTRACT

The invention relates to linear electric motor systems in general and in particular provides a parallel connected linear electric motor system in which the speed of the moving member and the force applied to the moving member of the motor system may be easily controlled.

40 Claims, 5 Drawing Figures

PARALLEL CONNECTED LINEAR ELECTRIC MOTOR SYSTEM

Hitherto linear electric motor systems have generally been of the induction or synchronous motor types however these types of motor system suffer from the disadvantage that the speed of the moving member of the system is not readily controlled. For example, the speed of a linear synchronous motor system may be controlled by changing the frequency of the alternating currents applied to the motor system however such a change of frequency is generally difficult to achieve economically.

It is well-known that the speed of conventional rotary direct current electric motors may be easily controlled but hitherto the advantages of direct or unidirectional currents could not be effectively utilised in many linear motor systems because the current switching function provided by a conventional rotary commutator has not been available in a linear motor system.

The foregoing disadvantages are overcome according to the present invention by a parallel connected linear electric motor system comprising an armature having at least one coil group including at least one conductor, each said coil group being individually connectable in parallel across a power supply through corresponding means for supplying a unidirectional flow of current through said coil group for a predetermined period of time, means for independently selecting the direction of flow of said unidirectional current in each said coil group, and magnetic field means having at least one field member and a corresponding associated unidirectional magnetic field, said magnetic field means and said armature being operatively associated with a linear track and being arranged to provide a mutual force between said coil group or groups and said magnetic field or fields on flow of said current, thereby producing relative translational motion between said armature and said magnetic field means.

Alternatively the abovementioned disadvantages are overcome by a parallel connected linear electric motor system comprising magnetic field means having at least one field member and a corresponding associated magnetic field, means for individually producing and maintaining each said field in a unidirectional polarity state for a predetermined period of time, means for independently selecting the polarity of each said unidirectional field, an armature having at least one coil group including at least one conductor and current supply means for supplying said coil group or groups with unidirectional current, said magnetic field means and said armature being operatively associated with a linear track and being arranged to provide a mutual force between said coil group or groups and said magnetic field or fields on flow of said current and production of said field or fields, thereby producing relative translational motion between said armature and said magnetic field means.

In both the abovementioned alternatives, either the armature is fixed to and extends along the track and the magnetic field means is mounted for motion relative to the track, or the magnetic field means is fixed to and extends along the track and the armature is mounted for motion relative to the track.

Figure 2:
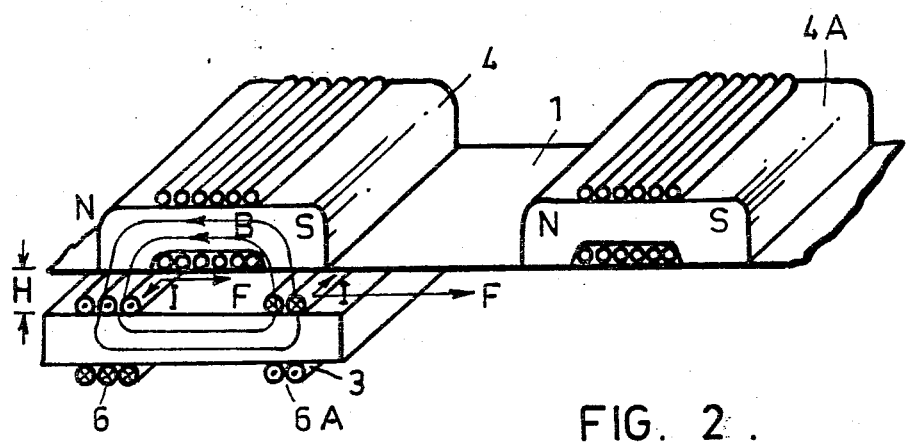
Figure 3:
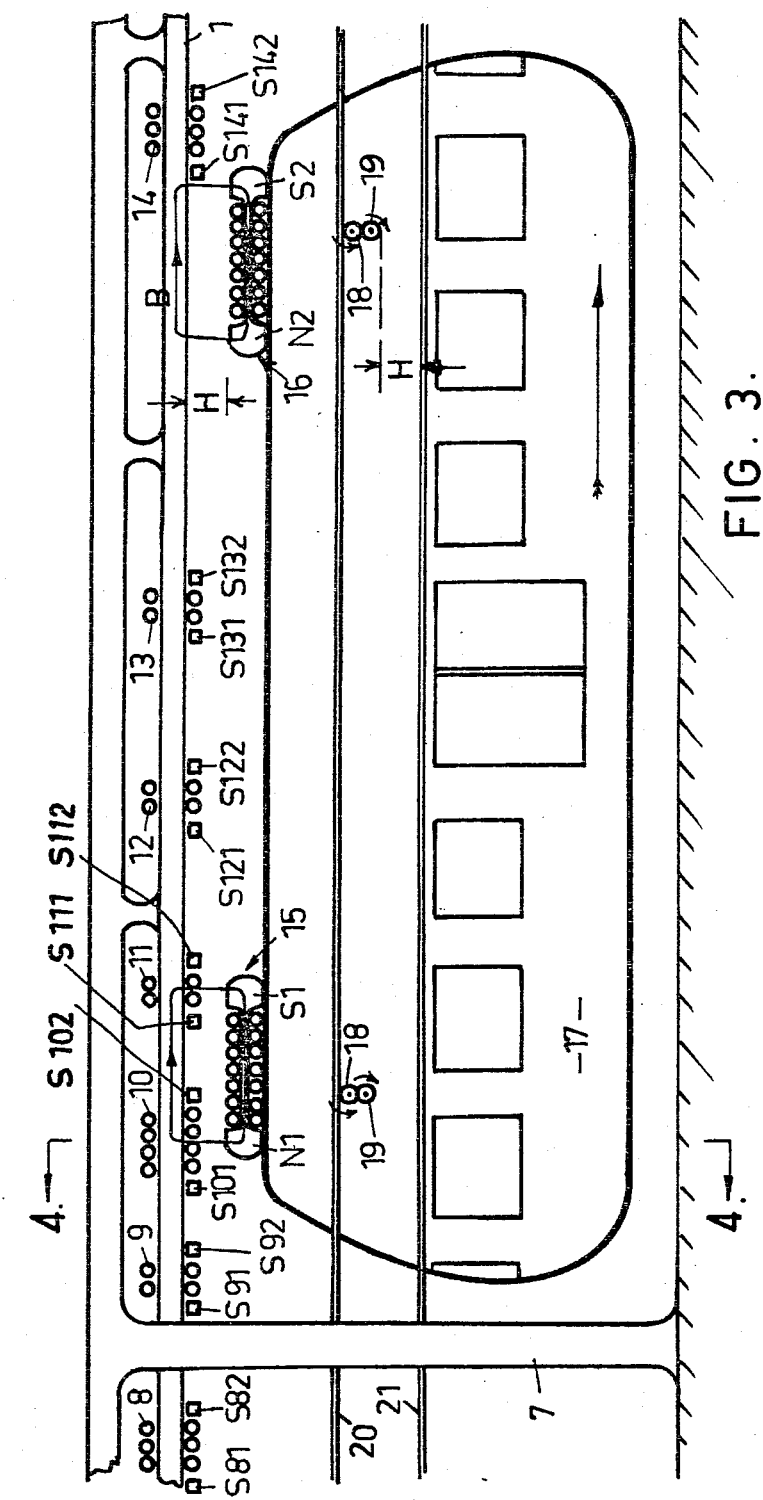
Figure 4:
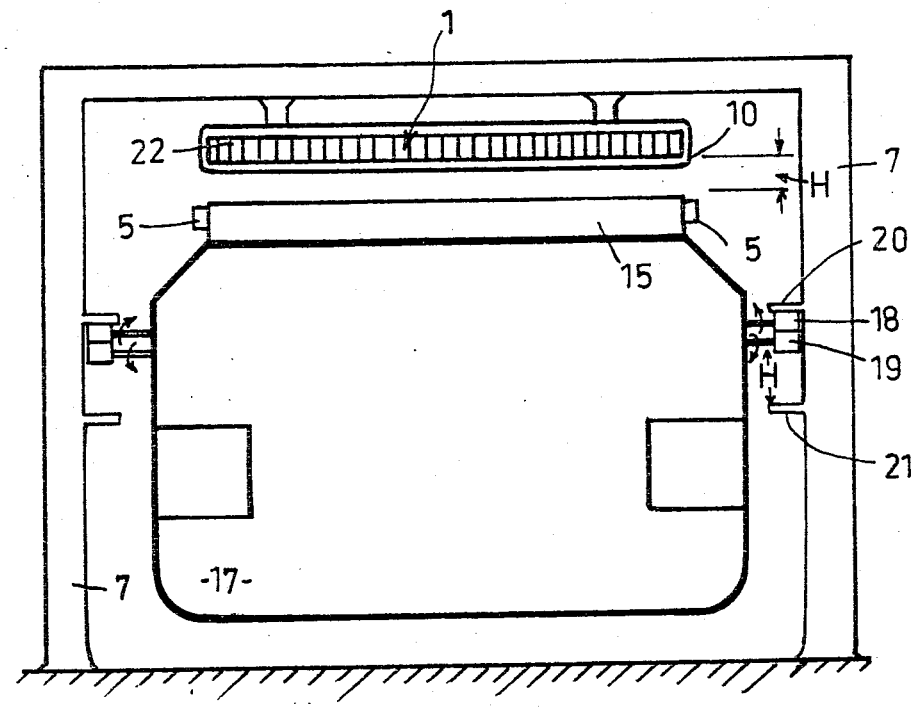
Figure 5:
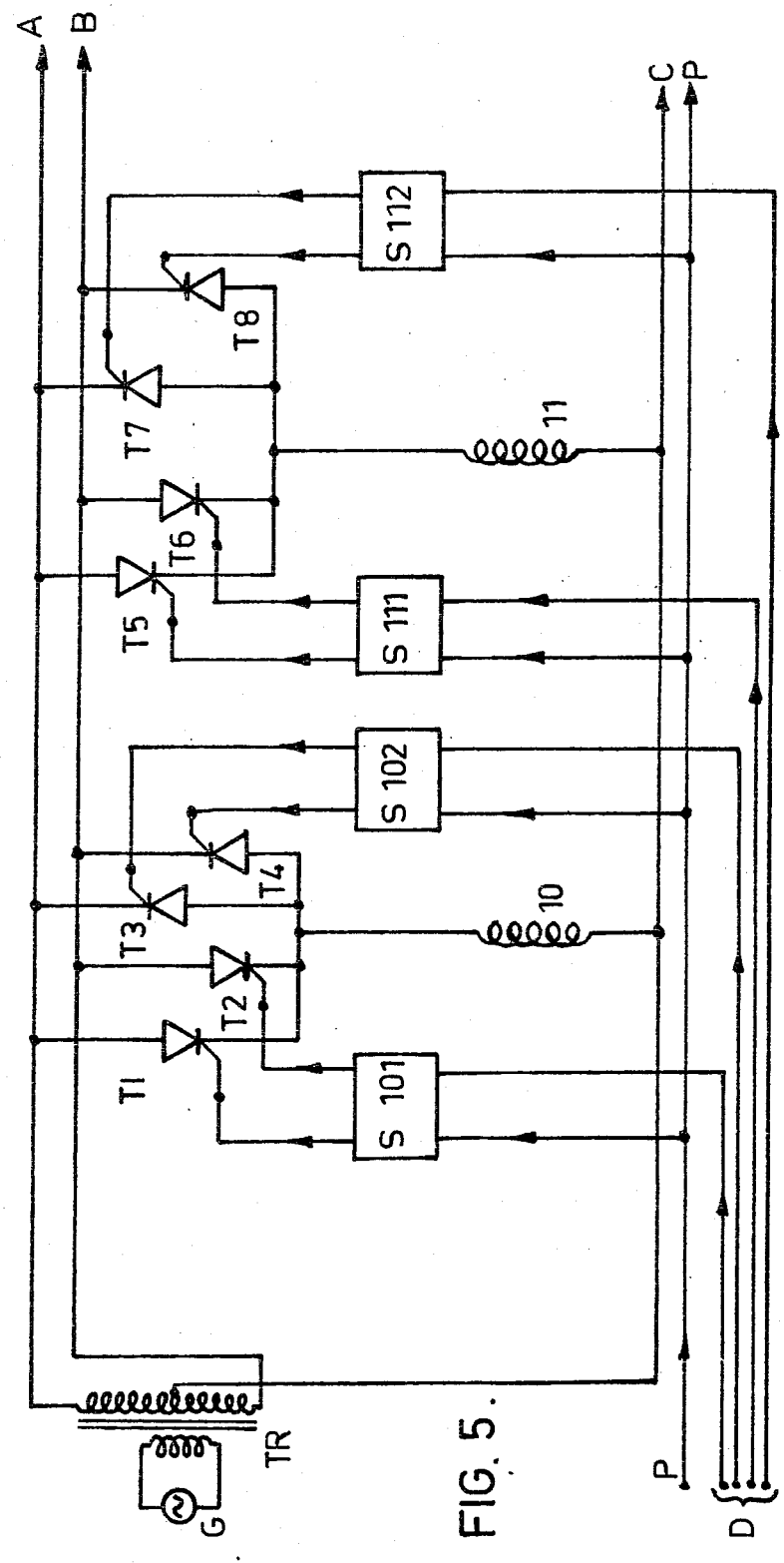

In order that the invention be readily understood a description of some preferred embodiments of the invention and a description of a transport system utilising the invention will be given followed by a further discussion on the general nature of the invention. The description of the preferred embodiments will be made with reference to the accompanying drawings in which:

FIG. 1 is a schematic diagram illustrating the principle of the invention with the armature fixed to the track, FIG. 2 is a schematic diagram illustrating the principle of the invention with the magnetic field means fixed to the track, FIG. 3 is a schematic elevation of a transport system embodying the invention, FIG. 4 is a schematic cross-sectional view along the line 4—4 of FIG. 3 and, FIG. 5 is a circuit diagram illustrating the circuits supplying current to the armature illustrated in FIG. 3.

FIG. 1 shows a linear track 1 having two coil groups 2 and 2A wound transversely around the track 1. Each coil group 2 and 2A includes a number of individual turns 3. Located immediately below the track 1 is a magnetic field member 4 including a field inducing winding 5. In the interests of clarity a portion of the turns 3 and winding 5 is not shown in FIG. 1. A current flows in the winding 5 thereby creating a magnetic field represented by B which passes through the field member 4, across an air gap H between the field member 4 and the track 1, through the track 1 to return to the field member 4. The field member 4 has a north pole N and a south pole S and the magnetic field B of the field member 4 influences the turns 3 of the coil groups 2 and 2A.

The turns 3 of the coil groups 2 and 2A carry an armature current I, the direction of flow of which is indicated in the conventional manner. The length of the turns 3 influenced by the magnetic field B is designated L and therefore the magnetic field B and the turns 3 experience a mutual force F, which since the turns 3 of the armature are fixed to the track 1, acts to move the magnetic field B and hence the field member 4 to the right as seen in FIG. 1.

Clearly, in order to maintain the field member 4 in sustained motion to the right as seen in FIG. 1, when the north pole N of the magnetic field member 4 has moved to the right so as to lie under coil group 2A, then either the direction of the current flowing in coil group 2A must be reversed or the polarity of the magnetic field B must be reversed. In the preferred embodiment of the invention it is the armature current I that is reversed, rather than the magnetic field B, in order to maintain continuous translational motion between the field member 4 and the coil groups 2 and 2A on the track 1.

FIG. 2 shows the alternative situation to that illustrated in FIG. 1, in that two magnetic field members 4 and 4A are fixed to the track 1 and coil groups 6 and 6A which carry the armature current I are able to move relative to the track 1. The same physical considerations apply to create the force F between the magnetic field B and the turns 3 of the coil groups 6 and 6A. In FIG. 2 as the field members 4 and 4A are fixed to the track 1 it is coil groups 6 and 6A of the armature which move relative to the track 1 to the right as seen in FIG. 2.

When coil group 6 has moved sufficiently to the right to be influenced by the south pole S of the magnetic field member 4 and similarly coil group 6A has moved sufficiently to the right to be influenced by the north pole N of the magnetic field member 4A, then the direction of flow of the armature current I in both coil groups 6 and 6A must be reversed in order that the force F continues to be applied to the turns 3 of the coil groups 6 and 6A in order to move the coil groups 6 and 6A to the right in FIG. 2.

It is this change in the direction of flow of the armature current I or the abovementioned change in the polarity of the magnetic field B which enables relative translational motion between the coil group(s) of the armature and the magnetic field member(s) to be maintained.

FIGS. 3 and 4 show the motor system of the present invention utilized to provide the source of both translational energy and support for a transportation system. The motor system has the form in which the coil groups of the armature are fixed to the track and the magnetic field members are adapted for motion relative to the track. The track 1 is supported by a series of pairs of upright members 7 spaced at intervals along the track. Only one pair of the upright members 7 is shown in FIG. 3. Coil groups 8 to 14 are spaced at intervals along the track 1 and magnetic sensors S81, S82, S91, S92, ... S142 are respectively associated in pairs with each of the coil groups 8 to 14.

Two magnetic field members 15 and 16 having north poles N1 and N2 respectively and south poles S1 and S2 respectively are suspended beneath the track 1. Each magnetic field member 15 and 16 includes a field inducing winding 5 which when supplied with current creates a magnetic field B which passes through the magnetic field members 15 and 16 across an air gap H and through the track 1 to return to the respective field member 15 and 16 as shown in FIG. 3. The track 1 is formed from permeable material such as steel laminations 22. The magnetic attraction between the magnetic field members 15 and 16 and the track 1 provides an uplifting force which holds the magnetic field members 15 and 16 adjacent to the track 1.

Suspended beneath and secured to the field members 15 and 16 is a vehicle 17. The vehicle 17 has four pairs of wheels each pair having an upper wheel 18 and a lower wheel 19. The wheels 18 and 19 are so positioned that the motion of any one of the wheels 18 and 19 drives the other wheel. When current is flowing in the windings 5 of the magnetic field members 15 and 16, the magnetic attraction between the field members 15 and 16 and the track 1 provides an upward force on the vehicle 17 which just overcomes the weight of the vehicle and holds upper wheels 18 in contact with an upper rail 20 with only a small bearing force thereby reducing wear. With upper wheels 18 bearing against the upper rail 20, the vehicle 17 can run along the upper rail 20 whilst the air gap H between the track 1 and the field members 15 and 16 remains substantially constant. When upper wheels 18 are held against the upper rail 20, the lower wheels 19 are held just clear of a lower rail 21. Thus when the vehicle 17 moves to the right as seen in FIG. 3, upper wheels 18 rotate in an anticlockwise direction and bear against the upper rail 20, whilst the lower wheels 19 are driven in a clockwise direction by the upper wheels 18 and rotate clear of the lower rail 21.

In the event that the current flowing in the windings 5 on the magnetic field members 15 and 16 is for some reason interrupted, the magnetic attraction between field members 15 and 16 and the track 1 is broken and therefore there is no uplifting force applied to the vehicle 17. In this event the vehicle 17 drops slightly and lower wheels 19 then bear on the lower rail 21 whilst the upper wheels 18 are clear of the upper rail 20. The directions of rotation of the wheels 18 and 19 are maintained and the smooth motion of the vehicle 17 continued despite the loss of uplift.

The coil group 10 is influenced by north pole N1 of the field member 15 and coil group 11 is influenced by south pole S1 of the field member 15. The armature current I in coil groups 10 and 11 flows in such a direction that the magnetic field member 15 experiences a force to the right as seen in FIG. 3. South pole S1 therefore moves away from coil group 11 and north pole N1 moves towards coil group 11 and away from coil group 10. As will be explained in more detail hereafter, the movement of the south pole S1 away from coil group 11 stops the flow of current in coil group 11 and the approach of magnetic pole N1 towards coil group 11 initiates the flow of armature current in coil group 11 in the opposite direction from that previously existing.

Thus, field member 15 experiences a force which moves the vehicle 17 to the right as seen in FIG. 3 whilst magnetic pole N1 influences coil group 11. Simultaneously magnetic pole S2 of field member 16 approaches coil group 14 and initiates the flow of armature current in coil group 14 so that field member 16 also experiences a force moving the vehicle 17 to the right as seen in FIG. 3. This procedure is repeated as the vehicle 17 moves along the track 1.

The initiation and cessation of the armature current in the coil groups will now be explained with reference to FIG. 5 which shows, in schematic form, a portion of the wiring connections required for each coil group. Two coil groups 10 and 11 of FIG. 3 are shown in FIG. 5. The source of power for the required armature currents in this instance is a conventional alternating current mains supply indicated in FIG. 5 at G. Other sources of power such as rectified AC or DC or even batteries may be used as will be obvious to those skilled in the art.

The mains G are connected to the primary winding of a transformer TR and the secondary winding of the transformer TR is centre tapped to provide a common line C. The ends of the secondary winding of the transformer TR respectively provide active lines A and B. Coil group 10 is connected between active lines A and B and common line C through thyristors (hereinafter termed SCR's) T1 to T4 and coil group 11 is similarly connected between active lines A and B and common line C by SCR's T5 to T8. Operatively associated with coil group 10 are magnetic sensors S101 and S102 and operatively associated with coil group 11 are magnetic sensors S111 and S112.

The magnetic sensors are of a conventional type and include a SCR trigger circuit together with means to isolate the sensors from the active lines A and B. The magnetic sensors S101 to S112 are supplied with power from a supply line P. The preferred form of the magnetic sensors S101 to S112 is the magnetically sensitive integrated circuit elements described in a paper entitled "Magneto-Transistors incorporated in an Integrated Circuit" by L. W. Davies and M. S. Wells Proc. IREE Aust. Vol 32 June 1971.

Each magnetic sensor S101 to S112 is connected through a line indicated at D to a central control (not shown) which sends an enabling signal to the required magnetic sensor when a specified coil group is required to conduct current in a specified direction. When magnetic sensor S101 is influenced by a north magnetic pole and receives and enabling signal through line D, the magnetic sensor S101 continuously or repeatedly triggers SCR's T1 and T2. Coil group 10 therefore receives a unidirectional flow of armature current I from both active lines A and B to common line C.

If either the north magnetic pole no longer influences the magentic sensor S101 or magnetic sensor S101 no longer receives an enabling signal on line D, or both, then magentic sensor S101 no longer triggers SCR's T1 and T2 and thus SCR's T1 and T2 will cease conduction at the end of the appropriate mains cycle. Similarly if sensor S102 is influenced by a south magnetic pole and receives an enabling signal on line D, SCR's T3 and T4 are continuously or repeatedly triggered and coil 10 receives the flow of unidirectional armature current from common line C to active lines A and B. Again, if the enabling signal on line D is removed, or magnetic sensor S102 is no longer influenced by a south pole, or both, the flow of current will cease as SCR's T3 and T4 will no longer be triggered by magnetic sensor S102. A similar situation applies with respect to coil group 11.

Thus the direction of current flow in each coil group of the armature may be controlled from a central control through the lines D. In addition, the armature current will not flow unless the required coil group is being influenced by a magnetic field of the correct polarity. Therefore, the motion of the vehicle 17 along the track 1 may be controlled from the central control by means of the lines D connected between the central control and each of the magnetic sensors S81 to S142.

The acceleration of the vehicle 17 may also be controlled by the central control through the lines D. If maximum acceleration is required all the lines D have signals applied thereto and each of the sensors S81 to S142 will conduct in turn when influenced by a magnetic pole of the correct polarity. However, if only a moderate acceleration is required, only some of the magnetic sensors S81 to S142 will receive the enabling signal from the central control through lines D.

In addition, the spacing of the coil groups 8 to 14 along the track may be arranged so that both portions of the secondary winding of the transformer TR carry approximately equal currents and therefore the transformer TR does not draw an unbalanced current from the mains supply G. Also should a positive breaking force electrically applied to the vehicle 17 be desirable, this may be easily achieved by including additional magnetic sensors which will trigger the SCR's T3 and T4 when coil group 10 is influenced by a north pole for example, thereby producing a force which will tend to move the vehicle 17 to the left as seen in FIG. 3. Alternatively, a mechanical breaking system could be used. Other methods of controlling and switching the current in the armature coil groups will be obvious to those skilled in the art and the above described embodiment is not limiting. For example, individually controllable DC voltages may be directly applied to each group.

The spacing of the coil groups 8 to 14 may be arranged so that on those portions of the track where it is desired to accelerate the vehicle the coil groups are relatively closely spaced and have many turns whilst those portions of the track where it is desired to have the vehicle travel at a uniform speed for long distances the coil groups are evenly and widely spaced. The turns within the coil group and/or coil groups may be interconnected in any manner as desired. A coil group may consist merely of a single conductor, or of a plurality of turns and, if desired, the plurality turns may be connected in series, or in parallel, or in series-parallel.

The connection of the coil groups in parallel across the power supply as indicated in FIG. 5, allows the current in each coil group to be individually controlled and its direction of flow individually selected. This is to be contrasted with conventional rotary and linear motor windings in which the same current flows through all the coil groups of a single winding. Furthermore the coil groups may carry currents of different magnitudes if desired.

The magnetic field members 15 and 16 have been illustrated in the drawings with a magnetic field produced by the winding 5. Clearly permanent magnets could be used to provide the desired magnetic field. Alternatively the winding 5 can be arranged to be superconducting.

It is advantageous if the moving member of the motor system does not require any electrical connections to be made thereto as this increases the capital cost of the transportation system and it is difficult to maintain a good electrical connection to members moving at a high speed. The current in the winding 5 may be supplied either by batteries or other means included in the moving vehicle.

The sensors S81 to S142 need not be positioned on the track adjacent the coil groups 8 to 14 as shown since armature reaction, for example, may require that the sensors be spaced some distance from the coil groups. In addition, a system of controlling the current flowing the coil groups which includes magnetic sensors located on the moving vehicle rather than on the track may be provided. Clearly, if desired, another vehicle or vehicles may be connected to the above described vehicle to form a train. Furthermore the above described current control system may include the transmission to the central control of a signal from the magnetic sensors indicating that the sensors were being influenced by a magnetic pole of a specific polarity. Such signals would indicate the position of the vehicle on the track. The time difference between the receipt of such signals and the transmission of the enabling signals would provide a measure of the deviation of the vehicle from its desired position. Such a measure may be utilized to change the time of transmission of and the nature of the enabling signals to control the position and speed of the vehicle. Alternatively the time difference between the arrival of the enabling signal and the magnetic field at the sensor could be used to control the triggering angle of the SCR's and hence the armature current.

The foregoing describes only some of the embodiments of the present invention and modifications, obvious to those skilled in the art, may be made thereto without departing from the scope of the present invention.

I claim:

1. A parallel connected linear electric motor system comprising an armature having at least one coil group including at least one conductor, said coil group being individually connectable in parallel across a power supply through corresponding means for supplying a unidirectional flow of current through said coil group for a predetermined period of time, means for independently selecting the direction of flow of said unidirectional current in said coil group, and magnetic field means having at least one field member and a corresponding associated unidirectional magnetic field, said magnetic field means and said armature being operatively associated with a linear track and being arranged to provide a mutual force between said coil group and said magnetic field on flow of said current, thereby producing relative translational motion between said armature and said magnetic field means.

2. The motor system as claimed in claim 1 wherein said means for independently selecting the direction of flow of said unidirectional current in said coil group includes a magnetic sensor operatively associated with said coil group and responsive to the magnetic field influencing said coil group.

3. The motor system as claimed in claim 1 wherein said armature is fixed to and extends along said track and said magnetic field means is a moving member and is mounted for motion relative to said track.

4. The motor system as claimed in claim 3 wherein said means for independently selecting the direction of flow of said unidirectional current in said coil group includes a magnetic sensor operatively associated with said coil group and responsive to the magnetic field influencing said coil group.

5. The motor system as claimed in claim 3 wherein said track is formed from a permeable material, a vehicle is secured to said magnetic field member, and said magnetic field member is maintained in operative relationship with said permeable track by magnetic attraction therebetween.

6. The motor system as claimed in claim 5 wherein said means for independently selecting the direction of flow of said unidirectional current in said coil group includes a magnetic sensor operatively associated with each coil group and responsive to the magnetic field influencing said coil group.

7. The motor system as claimed in claim 1 wherein said magnetic field means is fixed to and extends along said track and said armature is a moving member and is mounted for motion relative to said track.

8. The motor system as claimed in claim 7 wherein said means for independently selecting the direction of flow of said unidirectional current in said coil group includes a magnetic sensor operatively associated with said coil group and responsive to the magnetic field influencing said coil group.

9. The motor system as claimed in claim 7 wherein a vehicle is secured to said moving member.

10. The motor system as claimed in claim 9 wherein said means for independently selecting the direction of flow of said unidirectional current in said coil group includes a magnetic sensor operatively associated with said coil group and responsive to the magnetic field influencing said coil group.

11. The motor system as claimed in claim 1 wherein said armature has a plurality of coil groups including at least one conductor, each said coil group being individually connectable in parallel across said power supply through corresponding means for supplying a unidirectional flow of current through said coil group for a predetermined period of time, and the direction of unidirectional current flow in each said coil group being independently selectable by said means for selecting the direction of flow of said unidirectional current.

12. The motor system as claimed in claim 11 wherein said means for independently selecting the direction of flow of said unidirectional current in said coil group includes a magnetic sensor operatively associated with each said coil group and responsive to the magnetic field influencing said coil group.

13. The motor system as claimed in claim 11 wherein said armature is fixed to and extends along said track and said magnetic field means is a moving member and is mounted for motion relative to said track.

14. The motor system as claimed in claim 13 wherein said means for independently selecting the direction of flow of said unidirectional current in each said coil group includes a magnetic sensor operatively associated with each said coil group and responsive to the magnetic field influencing said coil group.

15. The motor system as claimed in claim 13 wherein said track is formed from a permeable material, a vehicle is secured to said magnetic field member, and said magnetic field member is maintained in operative relationship with said permeable track by magnetic attraction therebetween.

16. The motor system as claimed in claim 15 wherein said means for independently selecting the direction of flow of said unidirectional current in each said coil group includes a magnetic sensor operatively associated with each said coil group and responsive to the magnetic field influencing said coil group.

17. The motor system as claimed in claim 11 wherein said magnetic field means is fixed to and extends along said track and said armature is a moving member and is mounted for motion relative to said track.

18. The motor system as claimed in claim 17 wherein said means for independently selecting the direction of flow of said unidirectional current in each said coil group includes a magnetic sensor operatively associated with each said coil group and responsive to the magnetic field influencing said coil group.

19. The motor system as claimed in claim 17 wherein a vehicle is secured to said moving member.

20. The motor system as claimed in claim 19 wherein said means for independently selecting the direction of flow of said unidirectional current in each said coil group includes a magnetic sensor operatively associated with each said coil group and responsive to the magnetic field influencing said coil group.

21. The motor system as claimed in claim 1 wherein said magnetic field means has a plurality of field members each with a corresponding associated unidirectional magnetic field, said magnetic field means and said armature being operatively associated with said linear track and being arranged to provide a mutual force between said coil group and said magnetic fields on flow of said current, thereby producing relative translational motion between said armature and said magnetic field means.

22. The motor system as claimed in claim 21 wherein said means for independently selecting the direction of flow of said unidirectional current in said coil group includes a magnetic sensor operatively associated with said coil group and responsive to the magnetic fields influencing said coil group.

23. The motor system as claimed in claim 21 wherein said armature is fixed to and extends along said track and said magnetic field means is a moving member and is mounted for motion relative to said track.

24. The motor system as claimed in claim 23 wherein said means for independently selecting the direction of flow of said unidirectional current in said coil group includes a magnetic sensor operatively associated with said coil group and responsive to the magnetic fields influencing said coil group.

25. The motor system as claimed in claim 24 wherein said track is formed from a permeable material, a vehicle is secured to said magnetic field member, and said magnetic field member is maintained in operative relationship with said permeable track by magnetic attraction therebetween.

26. The motor system as claimed in claim 25 wherein said means for independently selecting the direction of flow of said unidirectional current in said coil group includes a magnetic sensor operatively associated with said coil group and responsive to the magnetic fields influencing said coil group.

27. The motor system as claimed in claim 21 wherein said magnetic field means is fixed to and extends along said track and said armature is a moving member and is mounted for motion relative to said track.

28. The motor system as claimed in claim 27 wherein said means for independently selecting the direction of flow of said unidirectional current in said coil group includes a magnetic sensor operatively associated with said coil group and responsive to the magnetic fields influencing said coil group.

29. The motor system as claimed in claim 27 wherein a vehicle is secured to said moving member.

30. The motor system as claimed in claim 29 wherein said means for independently selecting the direction of flow of said unidirectional current in said coil group includes a magnetic sensor operatively associated with said coil group and responsive to the magnetic fields influencing said coil group.

31. The motor system as claimed in claim 1 wherein said armature has a plurality of coil groups including at least one conductor, each said coil group between individually connectable in parallel across said power supply through corresponding means for supplying a unidirectional flow of current through said coil group for a predetermined period of time, and the direction of said unidirectional current flow in each said coil group being independently selectable by said means for selecting the direction of flow of said unidirectional current and wherein said magnetic field means has a plurality of field members each with a corresponding associated unidirectional magnet field, said magnet field means and said armature being operatively associated with said linear track and being arranged to provide a mutual force between said coil groups and said magnetic field on flow of said current, thereby producing relative translational motion between said armature and said magnetic field means.

32. The motor system as claimed in claim 31 wherein said means for independently selecting the direction of flow of said unidirectional current in each said coil group includes a magnetic sensor operatively associated with each said coil group and responsive to the magnetic fields influencing said coil group.

33. The motor system as claimed in claim 31 wherein said armature is fixed to and extends along said track and said magnetic field means is a moving member and is mounted for motion relative to said track.

34. The motor system as claimed in claim 33 wherein said means for independently selecting the direction of flow of said unidirectional current in each said coil group includes a magnetic sensor operatively associated with each said coil group and responsive to the magnetic fields influencing said coil group.

35. The motor system as claimed in claim 33 wherein said track is formed from a permeable material, a vehicle is secured to said magnetic field member, and said magnetic field member is maintained in operative relationship with said permeable track by magnetic attraction therebetween.

36. The motor system as claimed in claim 35 wherein said means for independently selecting the direction of flow of said unidirectional current in each said coil group includes a magnetic sensor operatively associated with each said coil group and responsive to the magnetic fields influencing said coil group.

37. The motor system as claimed in claim 31 wherein said magnetic field means is fixed to and extends along said track and said armature is a moving member and is mounted for motion relative to said track.

38. The motor system as claimed in claim 37 wherein said means for independently selecting the direction of flow of said unidirectional current in each said coil group includes a magnetic sensor operatively associated with each said coil group and responsive to the magnetic fields influencing said coil group.

39. The motor system as claimed in claim 37 wherein a vehicle is secured to said moving member.

40. The motor system as claimed in claim 39 wherein said means for independently selecting the direction of flow of said unidirectional current in each said coil group includes a magnetic sensor operatively associated with each said coil group and responsive to the magnetic fields influencing said coil group.

* * * * *